United States Patent
Ishikawa et al.

(10) Patent No.: US 7,740,822 B2
(45) Date of Patent: Jun. 22, 2010

(54) METHOD FOR PURIFICATION OF DISILICON HEXACHLORIDE AND HIGH PURITY DISILICON HEXACHLORIDE

(75) Inventors: Koji Ishikawa, Minato-ku (JP); Hiroshi Suzuki, Minato-ku (JP); Yoshinori Kimata, Minato-ku (JP)

(73) Assignee: Toagosei Co., Ltd., Tokyo (JP)

( * ) Notice: Subject to any disclaimer, the term of this patent is extended or adjusted under 35 U.S.C. 154(b) by 33 days.

(21) Appl. No.: 11/910,459

(22) PCT Filed: Mar. 17, 2006

(86) PCT No.: PCT/JP2006/305441

§ 371 (c)(1),
(2), (4) Date: Dec. 13, 2007

(87) PCT Pub. No.: WO2006/109427

PCT Pub. Date: Oct. 19, 2006

(65) Prior Publication Data

US 2009/0053124 A1 Feb. 26, 2009

(30) Foreign Application Priority Data

Apr. 7, 2005 (JP) ............................ 2005-111438

(51) Int. Cl.
*C01B 33/08* (2006.01)
*B01D 15/00* (2006.01)

(52) U.S. Cl. .......................... 423/342; 423/341; 203/41

(58) Field of Classification Search ................. 423/341, 423/342; 203/41
See application file for complete search history.

(56) References Cited

U.S. PATENT DOCUMENTS

| 2004/0096582 A1* | 5/2004 | Wang et al. ............ 427/255.27 |
| 2006/0118723 A1* | 6/2006 | Kimata .................. 250/339.12 |

FOREIGN PATENT DOCUMENTS

| EP | 1 264 798 A1 | | 12/2002 |
| GB | 923784 | | 4/1963 |
| JP | 61-275125 | | 12/1986 |
| JP | 2-153815 | | 6/1990 |
| WO | WO 02/12122 A1 | | 2/2002 |
| WO | WO 2004/015401 | * | 2/2005 |

* cited by examiner

*Primary Examiner*—Jerry Lorengo
*Assistant Examiner*—Carlos Barcena
(74) *Attorney, Agent, or Firm*—Oblon, Spivak, McClelland, Maier & Neustadt, L.L.P.

(57) ABSTRACT

The objective of the present invention is to provide a method for obtaining a high purity disilicon hexachloride by removing a silanol with good efficiency from a disilicon hexachloride material containing the silanol as an impurity. The purification method for disilicon hexachloride of the present invention comprises a process for contacting a disilicon hexachloride material containing disilicon hexachloride and a silanol as an impurity with an adsorbent material such as activated carbon to remove the silanol. The method may further comprise a distillation process. The above processes are preferably performed in an atmosphere of an inert gas.

17 Claims, No Drawings

METHOD FOR PURIFICATION OF DISILICON HEXACHLORIDE AND HIGH PURITY DISILICON HEXACHLORIDE

TECHNICAL FIELD

The present invention relates to a method for purification of disilicon hexachloride and a high purity disilicon hexachloride. More specifically, it relates to a method for obtaining a high purity disilicon hexachloride by removing a silanol efficiently from a disilicon hexachloride material containing the silanol as an impurity, and to a high purity disilicon hexachloride which is obtained by this method. The high purity disilicon hexachloride of the present invention can be used as a material for forming silicon nitride layer in semiconductor device, and the like.

BACKGROUND ART

A silicon halide such as dichlorosilane is conventionally used as a starting material for silicon semiconductor. Recent years, the possibility of disilicon hexachloride has been considered to be expected as a CVD material for depositing silicon nitride layer at a low temperature compared with this dichlorosilane.

However, disilicon hexachloride, by whichever method it may be produced, contains a silanol as an impurity. So a high purity disilicon hexachloride is required for forming silicon nitride layer stably and a purification method for removing an impurity such as a silanol is demanded. If the impurity content is high, a deposition rate of silicon nitride may slow down. In addition, the impurity may be taken in the layer to lead a problem where a homogeneous layer may not be formed.

The purification method of a silicon chloride compound is disclosed, for example in JP-A H02-153815. This literature discloses an example where a chloro polysilane material is subjected to a contacting with activated carbon and then a distilling to purify.

DISCLOSURE OF THE INVENTION

Problem to be Solved by the Invention

The objective of the present invention is to provide a method for obtaining a high purity disilicon hexachloride by removing a silanol with good efficiency from a disilicon hexachloride material containing the silanol as an impurity.

Means to Solve the Problem

The present invention is as follows.

The method for purification of disilicon hexachloride of the present invention is characterized in comprising a contacting process for contacting a disilicon hexachloride material containing disilicon hexachloride and a silanol as an impurity with an adsorbent material to remove the silanol.

The adsorbent material may be activated carbon.

The method may comprise further a distilling process after the contacting process.

The processes are preferably performed in an atmosphere of an inert gas.

The high purity disilicon hexachloride of the present invention is characterized in that it is obtained by the method for purification of disilicon hexachloride described above. The high purity disilicon hexachloride of the present invention may be one whose content of a silanol is 1 ppm by mass or less. In addition, the high purity disilicon hexachloride of the present invention may be one whose content of a silanol is 0.05 ppm by mass or less.

Effect of the Invention

According to the purification method of the present invention, a silanol as an impurity can be removed efficiently to obtain a high purity disilicon hexachloride whose concentration of the compound is reduced by lower than the specified value.

In addition, according to the high purity disilicon hexachloride, it is preferred as a material for forming silicon nitride layer in semiconductor device, and the like.

BEST MODE FOR CARRYING OUT THE INVENTION

The present invention is explained in detail, hereinafter. The method for purification of disilicon hexachloride of the present invention comprises a contacting process for contacting a disilicon hexachloride material containing disilicon hexachloride and a silanol as an impurity with an adsorbent material to remove the silanol. It is noted that the "disilicon hexachloride material" contains disilicon hexachloride and an impurity such as a silanol. The concentration of the silanol is usually 4 ppm or more. In addition, examples of other impurities include a metal component, aluminum chloride, titanium tetrachloride and the like, depending on the production method of the disilicon hexachloride. Further, the term "silanol" means a silicon compound having a hydroxyl group.

The adsorbent material used in the contacting process may be used a conventionally and publicly known one without limiting shape, size and the like. Examples of this adsorbent material include activated carbon, silica gel, molecular sieve and the like. Among these, the activated carbon is preferred because it has a high absorptivity to a compound having a silanol group. In addition, it is preferred for removing a metal component and the like.

Activated carbon was usually produced from a coal-tar pitch, a petroleum pitch or the like, and examples thereof include a powdery activated carbon (gas activation charcoal, zinc chloride activation charcoal and phosphoric acid activation charcoal); a granular activated carbon (pulverized coal, granular charcoal and briquette); a fibrous activated carbon; a special molded activated carbon and the like. Among these, the granular activated carbon and/or the fibrous activated carbon are preferred. From the viewpoint of workability and the like, a granular one in the range from 5 to 500 meshes is preferred.

When the adsorbent material is used, it is preferable to use it in a condition where moisture content is as little as possible. Therefore, it is preferable to dry the adsorbent material beforehand. The drying method is selected depending on types of the adsorbent material. In the case where activated carbon is used, it is preferable to heat it in the presence of an inert gas such as nitrogen, helium and argon, or while streaming the inert gas (hereinafter, referred to "in an atmosphere of an inert gas"), or under a reduced pressure.

The heating condition may be selected depending on types and amount of the adsorbent material. When activated carbon is subjected to heating in an atmosphere of an inert gas, the general is that temperature is 120° C. or higher (preferably 140° C. or higher, and upper limit is usually 500° C.) and period is 4 hours or more (preferably 8 hours or more, and upper limit is usually 72 hours). In the case of treating it under a reduced pressure, it takes shorter time to dry by setting the temperature of 120° C. or higher (preferably 140° C. or higher, and upper limit is usually 500° C.) and the period of 1 hour or more (upper limit is usually 24 hours).

Specified examples in the contacting process include, (1) a method where an adsorbent material is added to a disilicon hexachloride material to disperse (batch method), (2) a method where an adsorbent material is filled in a cylinder such as a column and a disilicon hexachloride material is subjected to flowing into the cylinder from one side thereof (continuous method), and the like. Among these, the method (2) is preferred.

It is noted that ratio of the disilicon hexachloride material and the adsorbent material to be used and contacting time in the contacting process are not particularly limited.

It is preferred that contacting process is performed in an atmosphere of an inert gas such as nitrogen, helium and argon, and performing it in an atmosphere of an inert gas whose moisture content is 0.5 ppm by mass or less is particularly preferable. As moisture content is getting less, the conversion of disilicone hexachloride into silanol can be prevented better.

Examples of a method for generating the atmosphere of an inert gas include a method where an inert gas is just introduced into a system, a method where an inert gas is introduced from other side while reducing pressure, and the like. When a container, a cylinder, a tubular or the like are heated during and/or before introducing an inert gas, an atmosphere having less moisture content can be formed. It is similar to the distilling process described below.

In the method (2) above, a feeding amount of disilicon hexachloride material in flowing is selected depending on an inner diameter of the cylinder or the like, and is not particularly limited. It is, however, ordinarily in the range from 0.1 to 100 liters per hour and preferably from 0.5 to 20 liters per hour. The above range leads to a sufficient contact between the disilicon hexachloride material and the adsorbent material and the adsorbent material traps an impurity such as a silanol to collect a higher purity disilicon hexachloride.

In the case where the cylinder has heat resistance in the method (2) above, the adsorbent material is filled in this cylinder, heated in an atmosphere of an inert gas to dry sufficiently, and then the disilicon hexachloride material is flowed under the same atmosphere to proceed the contacting process efficiently.

The method for purification of disilicon hexachloride of the present invention may comprise a distilling process after the contacting process.

Specified examples in the distilling process include an application with a simple distillation and a multistage distillation where this simple distillation is repeated, a batch-wise distillation using a rectification tower, a continuous distillation using a rectification tower, and the like. The distillation temperature is generally in the range from 140° C. to 150° C. and preferably from 142° C. to 148° C. This distillation leads to a removal of a silicon chloride compound such as silicon tetrachloride, silicon trichloride and disilane tetrachloride.

It is preferable for the distilling process to conduct in the atmosphere of an inert gas such as nitrogen, helium and argon.

More effective purification method of disilicon hexachloride is to perform this distilling process and the above-mentioned contacting process in the same system whose condition is an atmosphere of an inert gas.

The cylinder, the container and the like that are used in the above-mentioned contacting process and distilling process, are preferably made of a stainless steel through viewpoints of easiness in vacuuming, heating and the like. When ones having its inner surface electropolished are used in particular, moisture attached on the inner surface can be removed in a short time.

In the purification method of the present invention, the collected disilicon hexachloride after each process is preferably stored in an atmosphere having little moisture.

The purification method leads to a high purity disilicon hexachloride of the present invention of which contents of a silanol and further a silicon chloride compound such as silicon tetrachloride, silicon trichloride and disilane tetrachloride, a metal component and the like are reduced.

The high purity disilicon hexachloride of the present invention has a silanol in an amount of preferably 1 ppm by mass or less and further preferably 0.05 ppm by mass or less. The content of this silanol can be determined by FT-IR. The above-mentioned silanol content can be determined with a calibration curve made by trimethylsilanol as a standard.

The high purity disilicon hexachloride of the present invention is suitable as a material for forming silicon nitride layer in semiconductor device, and the like.

EXAMPLE

Hereinafter, the present invention is explained concretely with some examples. The present invention is not restricted at all by these examples.

Example 1

The starting material for purification was a disilicon hexachloride material (I) whose silanol content by FT-IR using trimethylsilanol as a standard was 4.88 ppm by mass.

30 grams of activated carbon (product name "CP460B", manufactured by Futamura Chemical Co., Ltd.) pre-vacuum-dried at 150° C. in an atmosphere of nitrogen for eight hours was filled in a stainless steel column having its inner diameter of 36 mm and length of 200 mm. After that, 1 liter of the above-mentioned disilicon hexachloride material (I) was fed into the column in an atmosphere of nitrogen at a feeding rate of 2 liters per hour and collected. The silanol in the obtained disilicon hexachloride was analyzed as 0.55 ppm by mass.

Example 2

The starting material for purification was a disilicon hexachloride material (II) whose silanol content by FT-IR was 5.34 ppm by mass.

80 grams of activated carbon (product name "CP460B", manufactured by Futamura Chemical Co., Ltd.) pre-vacuum-dried at 150° C. in an atmosphere of nitrogen for 12 hours was filled in a stainless steel column having its inner diameter of 36 mm and length of 200 mm. After that, 5 liters of the above-mentioned disilicon hexachloride material (II) was fed into the column in an atmosphere of nitrogen at a feeding rate of 1 liter per hour and collected. The silanol in the obtained disilicon hexachloride was analyzed as 0.29 ppm by mass.

Subsequently, the obtained liquid was displaced to a stainless steel flask and set in a stainless steel distillatory equipment. Distillation was performed by rising to a temperature of 170° C. with a mantle heater for heating the flask and bubbling with nitrogen gas at this temperature. Disilicon hexachloride was collected at first fraction in an amount of 500 ml and at main fraction of 4 liters. The silanol in the main fraction of disilicon hexachloride was analyzed as 0.07 ppm by mass.

Example 3

The starting material for purification was a disilicon hexachloride material (III) whose silanol content by FT-IR was 4.51 ppm by mass.

10 grams of activated carbon (product name "CW480B", manufactured by Futamura Chemical Co., Ltd.) pre-vacuum-dried at 150° C. in an atmosphere of nitrogen for 12 hours was filled into a stainless steel column having its inner diameter of 10 mm and length of 300 mm, in a glove box sufficiently replaced with nitrogen. A stainless steel pipe and a valve were used to connect a lower side of the column (exit of the disilicon hexachloride material (III) to be fed) and a distillatory equipment (a stainless steel flask) and then an evacuation and a nitrogen purge were conducted in an interior of overall system. After replacement with nitrogen, moisture content in the system was measured with an aquameter as 0.3 ppm by mass.

Subsequently, 1 liter of the above-mentioned disilicon hexachloride material (III) was fed into the column at a feeding rate of 1 liter per hour and moved to the stainless steel flask through the stainless steel pipe. After that, distillation was conducted in the same manner as Example 2 to collect disilicon hexachloride at first fraction in an amount of 40 ml and at main fraction of 850 ml. The silanol in the main fraction of disilicon hexachloride was analyzed to prove 0.04 ppm by mass.

INDUSTRIAL APPLICABILITY

The high purity disilicon hexachloride of the present invention has a trace amount of a silanol and is preferred as a material for forming silicon nitride layer in semiconductor device, and the like. The silicon nitride layer can lead to high performance semiconductor device because of containing no impurities.

The invention claimed is:

1. A method for purifying disilicon hexachloride, the method comprising contacting a disilicon hexachloride material, comprising disilicon hexachloride contacting a silicon chloride compound and a silanol as an impurity, with an active carbon absorbent material, at room temperature, to produce a partially purified disilicon hexachloride material, and distilling the partially purified disilicon hexachloride material to produce purified disilicon hexachloride.

2. The method of claim 1, wherein the absorbent is granular activated carbon.

3. The method of claim 2, wherein the contacting is preformed in an atmosphere of an inert gas.

4. The method of claim 3, wherein, in the atmosphere of an inert gas, the inert gas is selected from nitrogen, helium, or argon.

5. The method of claim 4, wherein the inert gas is nitrogen.

6. The method of claim 5, wherein the nitrogen has a moisture content of 0.5 ppm by mass or less.

7. The method of claim 2, wherein the granular activated carbon has a mesh size ranging from 5 mesh to 500 mesh.

8. The method of claim 7, wherein the granular activated carbon has a mesh size to 500 mesh.

9. The method of claim 1, wherein the distilling is performed in an atmosphere of an inert gas.

10. The method of claim 9, wherein, in the atmosphere of an inert gas, the inert gas is selected from nitrogen, helium, or argon.

11. The method of claim 10, wherein the inert gas is nitrogen.

12. The method of claim 11, wherein the nitrogen has a moisture content of 0.3 ppm by mass.

13. The method of claim 10, wherein the distilling is performed at a temperature ranging from 140° C. to 150° C.

14. The method of claim 13, wherein the purified disilicon hexachloride has a silanol content of 1 ppm by mass or less.

15. The method of claim 13, wherein the purified disilicon hexachloride has a silanol content of 0.05 ppm by mass or less.

16. The method of claim 10, wherein the distilling is performed at a temperature of 170° C.

17. The method of claim 1, wherein the absorbent material is fibrous activated carbon.

* * * * *